US008388295B2

(12) United States Patent
Kamiya et al.

(10) Patent No.: US 8,388,295 B2
(45) Date of Patent: Mar. 5, 2013

(54) MOUNTING STRUCTURE

(75) Inventors: Kenichi Kamiya, Aichi (JP); Yasuaki Kawakami, Toyota (JP); Taku Tashima, Toyota (JP)

(73) Assignees: Toyota Jidosha Kabushiki Kaisha, Toyota-shi, Aichi-ken (JP); VTEC Co., Ltd., Anjyou-shi, Aichi (JP); NIFCO Inc., Kanagawa (JP)

( * ) Notice: Subject to any disclaimer, the term of this patent is extended or adjusted under 35 U.S.C. 154(b) by 973 days.

(21) Appl. No.: 12/159,494

(22) PCT Filed: Dec. 27, 2006

(86) PCT No.: PCT/JP2006/326145
§ 371 (c)(1),
(2), (4) Date: Jun. 27, 2008

(87) PCT Pub. No.: WO2007/074886
PCT Pub. Date: Jul. 5, 2007

(65) Prior Publication Data
US 2010/0260577 A1 Oct. 14, 2010

(30) Foreign Application Priority Data
Dec. 28, 2005 (JP) ................................ 2005-379910

(51) Int. Cl.
*F16B 19/00* (2006.01)
(52) U.S. Cl. ........................................ 411/508; 411/383
(58) Field of Classification Search .................. 411/41, 411/45–48, 182, 357, 360, 372.5, 372.6, 411/373, 508, 509, 536, 913, 383, 398, 539, 411/76, 80.5, 80.6; 24/289, 292–295, 297, 24/458, 573.09, 578.13, 581.11, DIG. 31; 280/86.753
See application file for complete search history.

(56) References Cited

U.S. PATENT DOCUMENTS

| | | | | |
|---|---|---|---|---|
| 1,732,993 A | * | 10/1929 | Spiro | 411/103 |
| 3,007,364 A | * | 11/1961 | Dickie | 411/15 |
| 3,078,064 A | * | 2/1963 | Turnbull | 248/239 |
| 3,534,797 A | * | 10/1970 | Haug et al. | 411/108 |
| 4,780,037 A | * | 10/1988 | Payne | 411/433 |
| 4,867,599 A | * | 9/1989 | Sasajima | 403/338 |
| 4,878,792 A | * | 11/1989 | Frano | 411/339 |
| 4,906,152 A | * | 3/1990 | Kurihara | 411/182 |
| 5,093,965 A | * | 3/1992 | Mauras et al. | 24/114.2 |

(Continued)

FOREIGN PATENT DOCUMENTS

| | | |
|---|---|---|
| GB | 2 362 427 | 11/2001 |
| JP | 5-3623 | 1/1993 |

(Continued)

*Primary Examiner* — Roberta Delisle
(74) *Attorney, Agent, or Firm* — Finnegan, Henderson, Farabow, Garrett & Dunner, LLP (57) ABSTRACT

To obtain a mounting structure capable of being applied to mount an object to be mounted by absorbing a central position variation between a pin and a female mounting member in more directions.
A cap pin 26 is formed with a long hole shaped male side fitting portion 36 so as to rotate in an arrow R1 direction with respect to a pin 28 and to relatively move slide in a sliding axis X2 direction. Even if a pin axis X1 of the pin 28 and a central axis X4 of a clip 24 are deviated, the cap pin 26 is rotated and slid; and accordingly, the pin 28 may be inserted and fitted to the male side insertion portion 36.

6 Claims, 11 Drawing Sheets

U.S. PATENT DOCUMENTS

| | | | |
|---|---|---|---|
| 5,290,137 A * | 3/1994 | Duffy, Jr. | 411/80.1 |
| 5,335,893 A * | 8/1994 | Opp | 248/635 |
| 5,387,065 A * | 2/1995 | Sullivan | 411/48 |
| 5,443,526 A * | 8/1995 | Hoerner | 623/38 |
| 5,507,610 A * | 4/1996 | Benedetti et al. | 411/339 |
| 5,593,262 A * | 1/1997 | Gedeon et al. | 411/182 |
| 5,599,148 A * | 2/1997 | Hirose | 411/175 |
| 5,651,632 A * | 7/1997 | Gordon | 403/319 |
| 5,772,380 A * | 6/1998 | Cloud et al. | 411/508 |
| 5,775,860 A * | 7/1998 | Meyer | 411/46 |
| 5,857,728 A | 1/1999 | Crotty, III | |
| 6,013,105 A * | 1/2000 | Potts | 623/38 |
| 6,048,147 A * | 4/2000 | Arisaka et al. | 411/48 |
| 6,454,503 B1 * | 9/2002 | Polic et al. | 411/45 |
| 6,457,217 B2 * | 10/2002 | Yoshii et al. | 24/297 |
| 6,543,098 B2 * | 4/2003 | Meyer et al. | 24/289 |
| 6,594,870 B1 * | 7/2003 | Lambrecht et al. | 24/297 |
| 6,991,413 B2 * | 1/2006 | Ballou et al. | 411/15 |
| 7,677,850 B2 * | 3/2010 | Sano | 411/45 |
| 7,857,565 B2 * | 12/2010 | Martinson | 411/136 |
| 2004/0091332 A1 * | 5/2004 | Kuntze | 411/107 |

FOREIGN PATENT DOCUMENTS

| | | |
|---|---|---|
| JP | U 5-3623 | 1/1993 |
| JP | 5-44680 | 6/1993 |
| JP | 7-41018 | 7/1995 |
| JP | U 7-41018 | 7/1995 |

* cited by examiner

MOUNTING STRUCTURE

TECHNICAL FIELD

The present invention relates to mounting structures. More particularly, the invention relates to a mounting structure which is used for mounting a member to be mounted serving as the other of objects to be mounted to a panel of a vehicle body, for example, serving as one of the objects to be mounted.

BACKGROUND ART

As a structure for mounting an exterior trim part to a vehicle body of an automobile, there is an example shown in Patent Document 1. In the structure shown in Patent Document 1, a fixing screw having an axial portion smaller in diameter than a threaded portion is passed through a long hole shaped screw pass-through hole of a lamp device and is mounted thereto; at the same time, a grommet for fixing the screw, which is provided with an inner grommet slidable in a direction intersecting with a long axis direction of the long hole in an outer grommet, is mounted to a rear panel of the vehicle body. Thus, center alignment is performed by positional adjustment between the fixing screw and the inner grommet with respect to a center deviation, and then, the fixing screw is screwed.

As described above, in the above structure, since the inner grommet slides in a long axis direction of the long hole, the center alignment in this direction is possible; however, it is desired to provide a structure capable of mounting by absorbing central position variations in directions other than this direction.

Patent Document 1: Japanese Utility Model Application Laid-Open (JP-U) No. 5-44680

DISCLOSURE OF THE INVENTION

Problems to be Solved by the Invention

In consideration of the above-described facts, it is an object of the present invention to obtain a mounting structure capable of mounting an object to be mounted by absorbing central position variations between a pin and a female mounting member in a plural direction.

Means for Solving Problem

According to the invention of claim 1, there is provided a mounting structure which includes: a female mounting member to be mounted on one of objects to be mounted; a female side fitting portion provided on the female mounting member; a male mounting member to be rotatably fitted to the female side fitting portion; and a male side fitting portion to which a pin provided in the male mounting member and formed on the other of the objects to be mounted is fitted, and in which the male mounting member is rotatable around the pin and slidable with respect to a direction perpendicular to a pin axis direction in a state where the pin is fitted.

Therefore, the male mounting member in which the pin is fitted to the male side fitting portion is rotatably fitted to the female side fitting portion of the female mounting member mounted on one of the object to be mounted, and the objects to be mounted are mounted. In this case, the male side fitting portion fixes the male mounting member rotatably around the pin and slidably with respect to the direction perpendicular to the pin axis direction. Then, the male mounting member is constituted to be rotatable to the female mounting member. That is, in the case where the centers of the pin and the female side fitting portion are deviated, the deviation may be absorbed by the rotation and slide of the male mounting member with respect to the pin.

As described above, the central position variation of the female mounting member in any direction perpendicular to the pin axis direction is absorbed by performing not only the slide in a mere one direction but also the rotation and slide, and the objects to be mounted may be mounted each other.

According to the invention of claim 2, in the invention of claim 1, the male mounting member is provided with a guide rib which comes into contact with an inner surface of the female side fitting portion when the male mounting member is fitted to the female side fitting portion, and rotates the male mounting member in the direction perpendicular to the pin axis direction by a reaction force acting at the contact.

According to the invention of claim 3, in the invention of claim 1, the male mounting member is formed with an engaging portion which locks the pin by engaging with a narrow portion of the fitted pin.

According to the invention of claim 3, in the invention of claim 1, the male mounting member is formed with an engaging portion which locks the pin by engaging with a fitted the.

According to the invention of claim 4, in the invention of claim 1, the male mounting member has a tip portion which is tapered off.

In addition, a configuration which is for inserting the pin to the male side fitting portion is not particularly limited, for example, as described in claim 5, it may be configured that the male mounting member is provided with a lateral inserting portion which enables the pin to be inserted to the male side fitting portion from the direction perpendicular to the pin axis direction; or it may be configured that the male mounting member is provided with an enlargable portion which enables the pin to be inserted in the pin axial direction by enlarging the male side fitting portion. In the case where a space is limited in the pin axis direction around the pin depending on a shape or the like of the object to be mounted, it is preferable to be the configuration of claim 5. In the above configuration, as described in claim 6, the lateral insertion portion may have a frontage which is formed smaller than a portion corresponding to the frontage of the pin when the pin is inserted to the lateral insertion portion. Furthermore, in the case where a space is limited in the direction perpendicular to the pin axis direction, it is preferable to have the configuration with the male mounting member having an enlargable portion. In the above configuration, as described in claim 8, the enlargable portion may serve as a slit formed in the male mounting member.

Effect of the Invention

The present invention has the above mentioned configuration; and therefore, it may be applied to mount an object to be mounted by absorbing a central position variation between a pin and a female mounting member in more directions.

BEST MODE FOR CARRYING OUT THE INVENTION

FIGS. 1 to 4 show a mounting structure 22 of the present invention. FIG. 5 shows a panel 12 of a vehicle body and a lamp unit 18, serving as one example of an object to be mounted, which is mounted by the mounting structure 22. In the example shown in this case, the lamp unit 18 constitutes a rear lamp of an automobile, and the lamp unit 18 is mounted to the panel 12 by the mounting structure 22.

The panel 12 is provided with at least one reference hole 14 and a round hole 16 formed at a predetermined position on the basis of the reference hole 14. The lamp unit 18 is mounted at the reference hole 14 by, for example, a bolt and a nut (both are not shown in the drawing). Then, the lamp unit 18 is mounted and fixed by the mounting structure 22 at the round hole 16 on the basis of the position of the reference hole 14. The round hole 16 is a round shape larger in diameter than the reference hole 14; and a clip 24 (to be described later) is fitted and fixed thereto. In addition, if required, mounting holes such as sub-reference holes are formed in addition to the reference hole 14, and the lamp units 18 are mounted to the panel 12 by the bolts and the nuts through these mounting holes. Furthermore, these mounting holes are formed in a shape (for example, a long hole shape, or an idle hole shape) which may absorb positional deviations between the reference hole 14 and the bolts even after the positions of the lamp units 18 are set by the reference hole. Further, a configuration in which in place of the sub-reference hole a profile portion such as a side surface of the lamp unit 18 is brought into contact with a sub-reference surface of the panel 12 is possible, and the above configuration may provide an improved appearance in design. In any of the above configurations, if the reference hole 14 is only served as a reference, the lamp unit 18 is likely to be rotated around the reference hole 14; and therefore, a sub-reference that can prevent the rotation is preferably disposed. For example, it is preferable to use a plurality of side surfaces of the panel unit 18 as the sub-reference.

Figure 1:
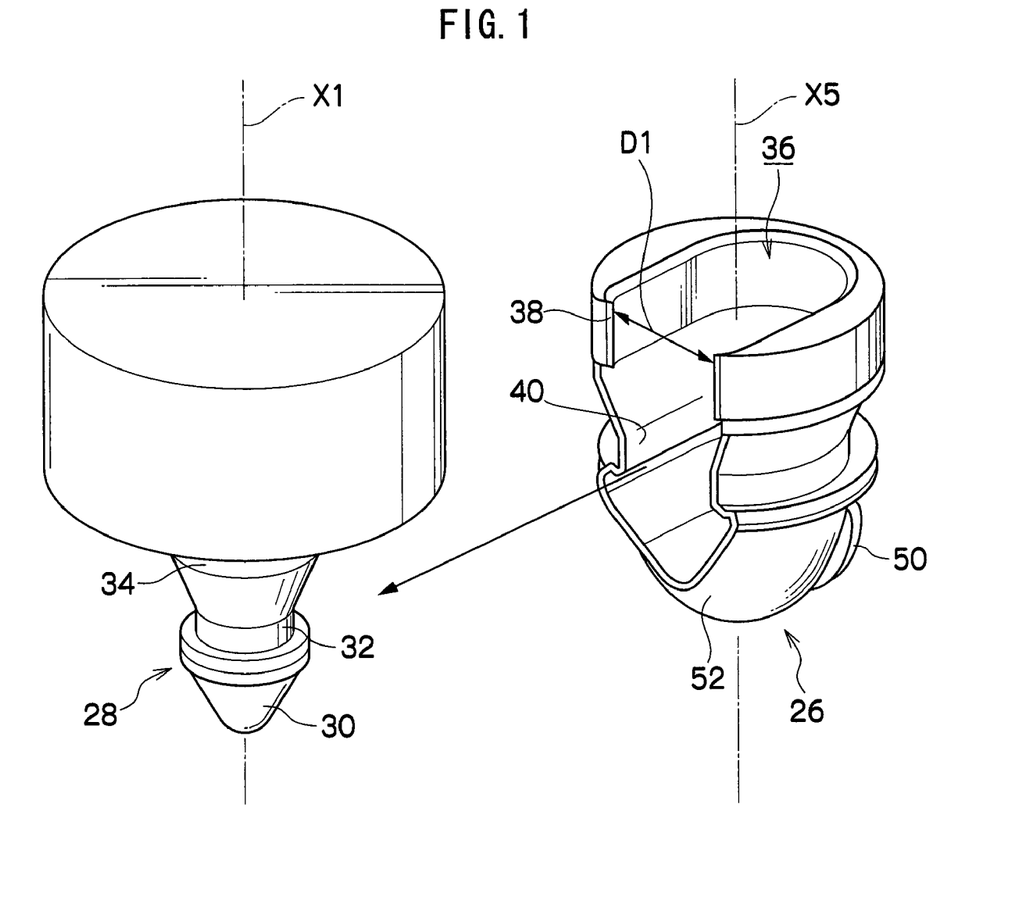
FIG. 1 is a perspective view showing a cap pin and a pin to be inserted and fitted to the cap pin, both of which constituting a mounting structure of a first exemplary embodiment of the present invention.
Figure 2:
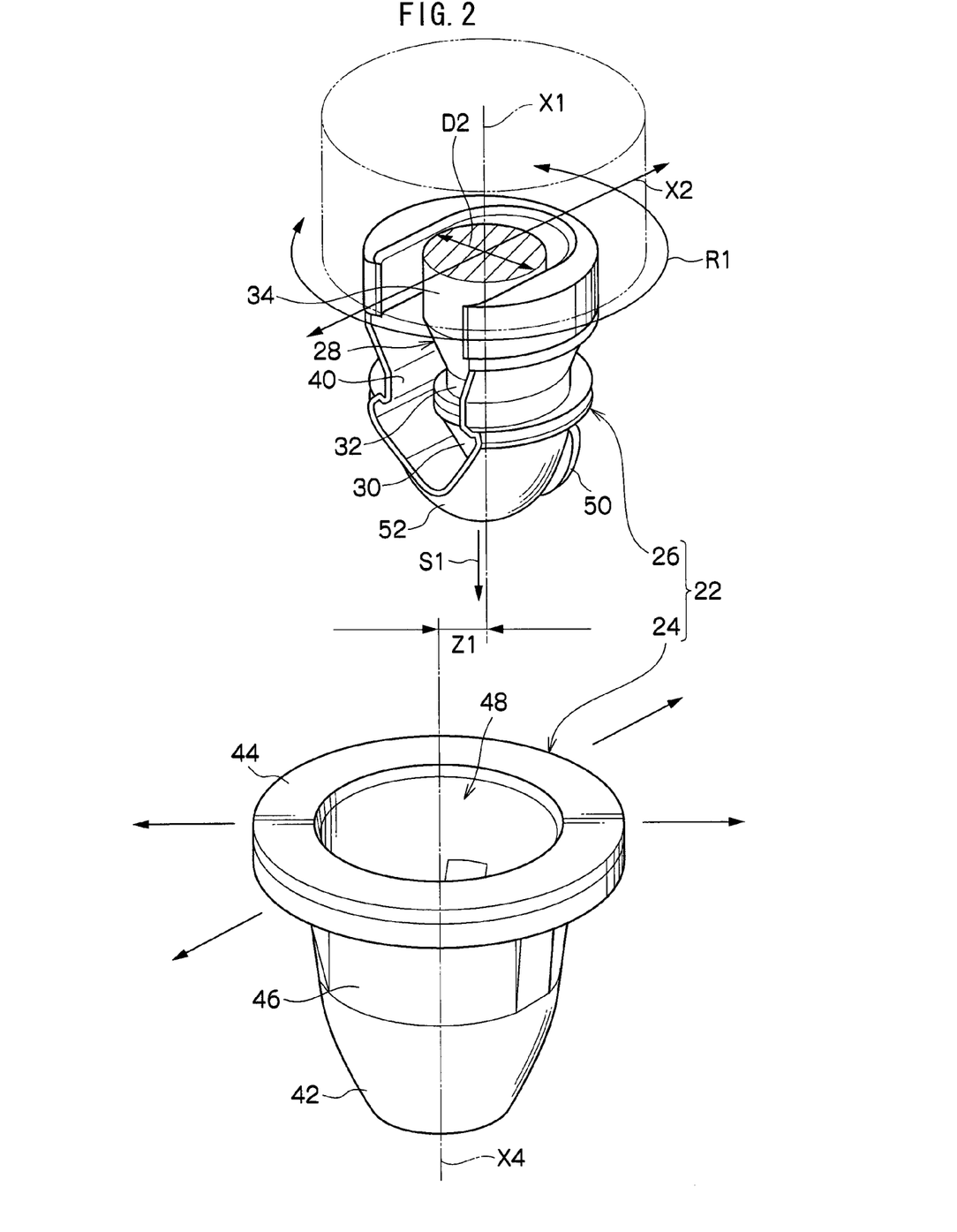
FIG. 2 is a partially broken perspective view showing the cap pin in a state where the pin is inserted and a perspective view showing a clip to which the cap pin is inserted and fitted, both of which constituting the mounting structure of the first exemplary embodiment of the invention.
Figure 3:
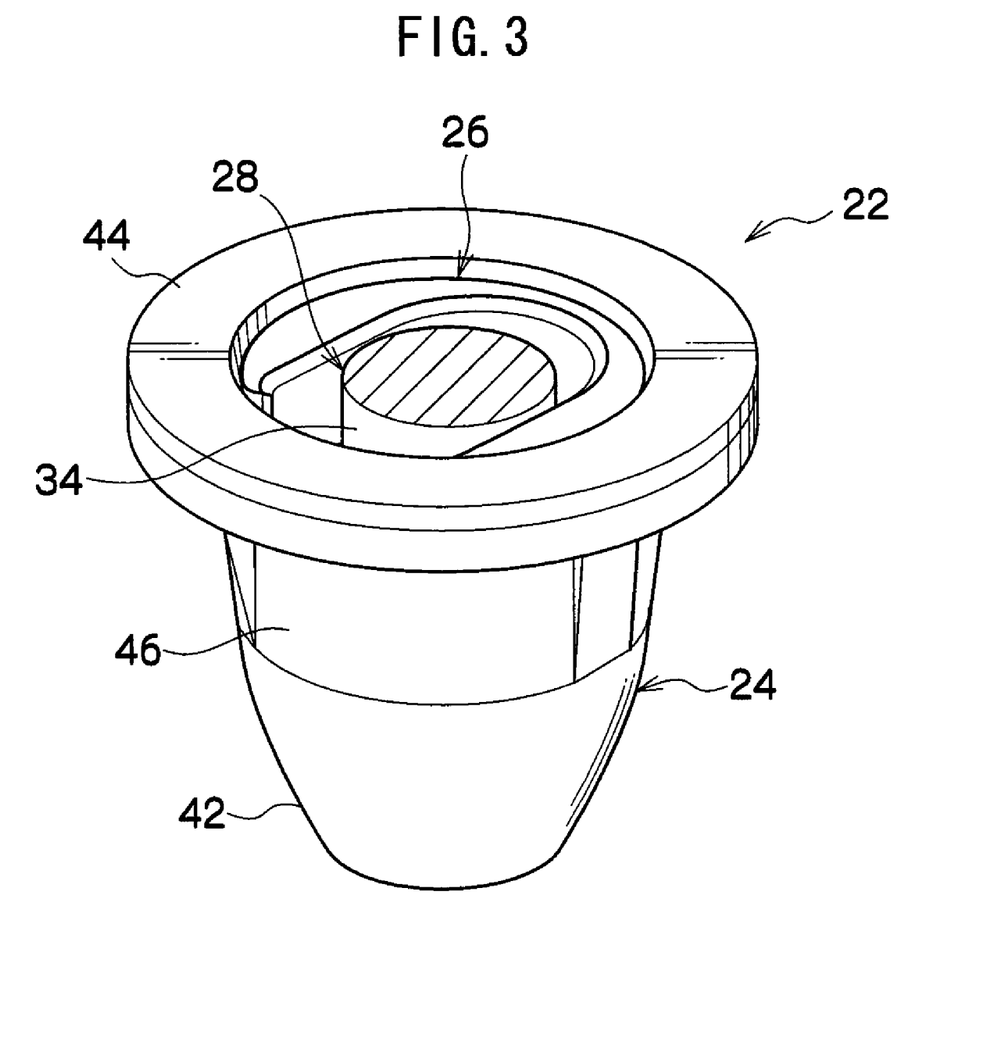
FIG. 3 is a partially broken perspective view showing the mounting structure of the first exemplary embodiment of the invention in a state where the pin is inserted and fitted to the cap pin and the cap pin is inserted and fitted to the clip.

As shown in FIGS. 1 and 2, the mounting structure 22 has the clip 24 to be fitted to the round hole 16 and a cap pin 26 to be fitted to the clip 24. A male side fitting portion 36, to which a pin 28 protruded from the lamp unit 18 is fitted, is formed at the center (on a central axis X5) of the cap pin 26.

As turned out from FIG. 1, the pin 28 is made up of a tip portion 30 gradually decreased in diameter toward the tip, a narrow portion 32 smaller in diameter than the tip portion 30 on the lamp unit 18 side, and a base portion 34 gradually increased in diameter from the narrow portion 32 and having a constant diameter D2 (see FIG. 2A) in the middle. On the other hand, the cap pin 26 is in a substantially cylindrical shape; however, a part of a sidewall thereof is opened and a lateral insertion portion 38, which enable the pin 28 to be inserted to the male side fitting portion 36 from a lateral direction (direction perpendicular to a pin axis X1), is formed. A frontage D1 of the lateral insertion portion 38 is smaller than the diameter D2 of the base portion 34 (portion corresponding to the frontage D1 when the pin 28 is inserted) of the pin 28; the frontage D1 is pressed and enlarged when the pin 28 is inserted; however, the pin 28 is provided so as not to come off from the male side fitting portion 36 in the opposite direction of the inserting direction once the pin 28 is inserted into the male side fitting portion 36.

Furthermore, an engaging portion 40, which is locally decreased in diameter so as to be engaged with the narrow portion 32, is formed in the male side fitting portion 36 of the cap pin 26; and consequently, the pin 28 is not easily come off from the cap pin 26 in the direction of the pin axis X1. Further, in a fitted state, an inner circumferential shape of the male side fitting portion 36 is set in accordance with an outer circumferential shape of the pin 28 so as to remain a minimum slidable gap therebetween; and the cap pin 26 rotates with respect to the pin 28 as shown by an arrow R1; and thus, the cap pin 26 rotates with respect to the clip 24 as to be described later.

The male side fitting portion 36 is continued from the lateral insertion portion 38 and is formed in a long hole shape so that the pin 28 is relatively moved (slid) with the cap pin 26 in the same direction as the inserting direction (hereinafter, referred to as a sliding direction, and shown by a sliding axis X2).

The clip 24 is formed in a substantially tubular shape with a tip portion 42 being formed in a tapered shape; and an annular shaped flange portion 44 is formed on the rear end. Furthermore, an intermediate portion 46 of the clip 24 is larger in diameter than a hole diameter of the round hole 16. When the clip 24 is inserted (press-fitted) to the round hole 16 from the tip portion 42 side until the flange portion 44 comes into contact with the panel 12, the clip 24 is fixed in a fitted state to the round hole 16 so that the intermediate portion 46 is sandwiched by an inner surface of the round hole 16.

The center of the clip 24 is a female side fitting portion 48 to which the cap pin 26 is inserted and fitted.

Figure 4:
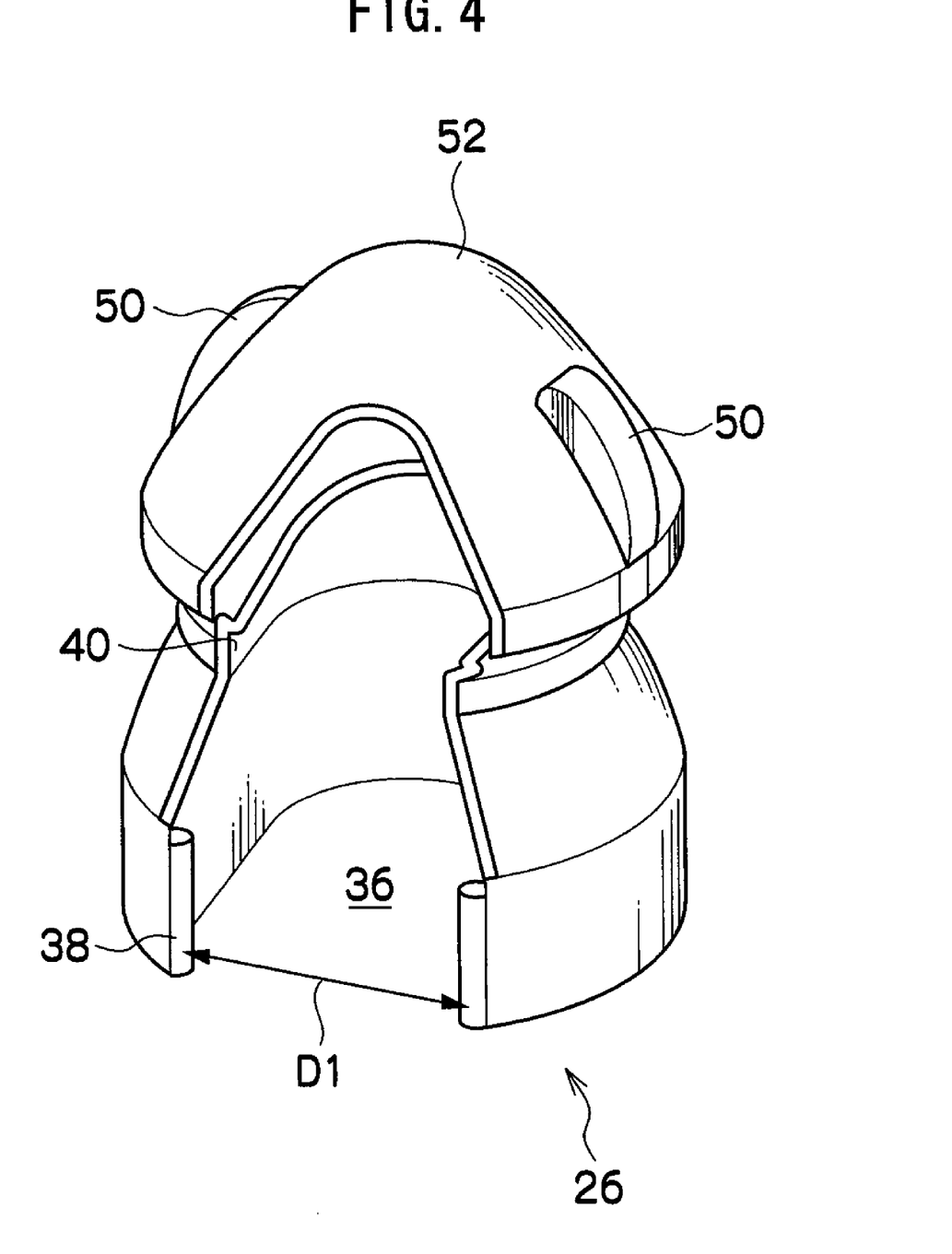
FIG. 4 is a perspective view showing the cap pin constituting the mounting structure of the first exemplary embodiment of the invention.
Figure 5:
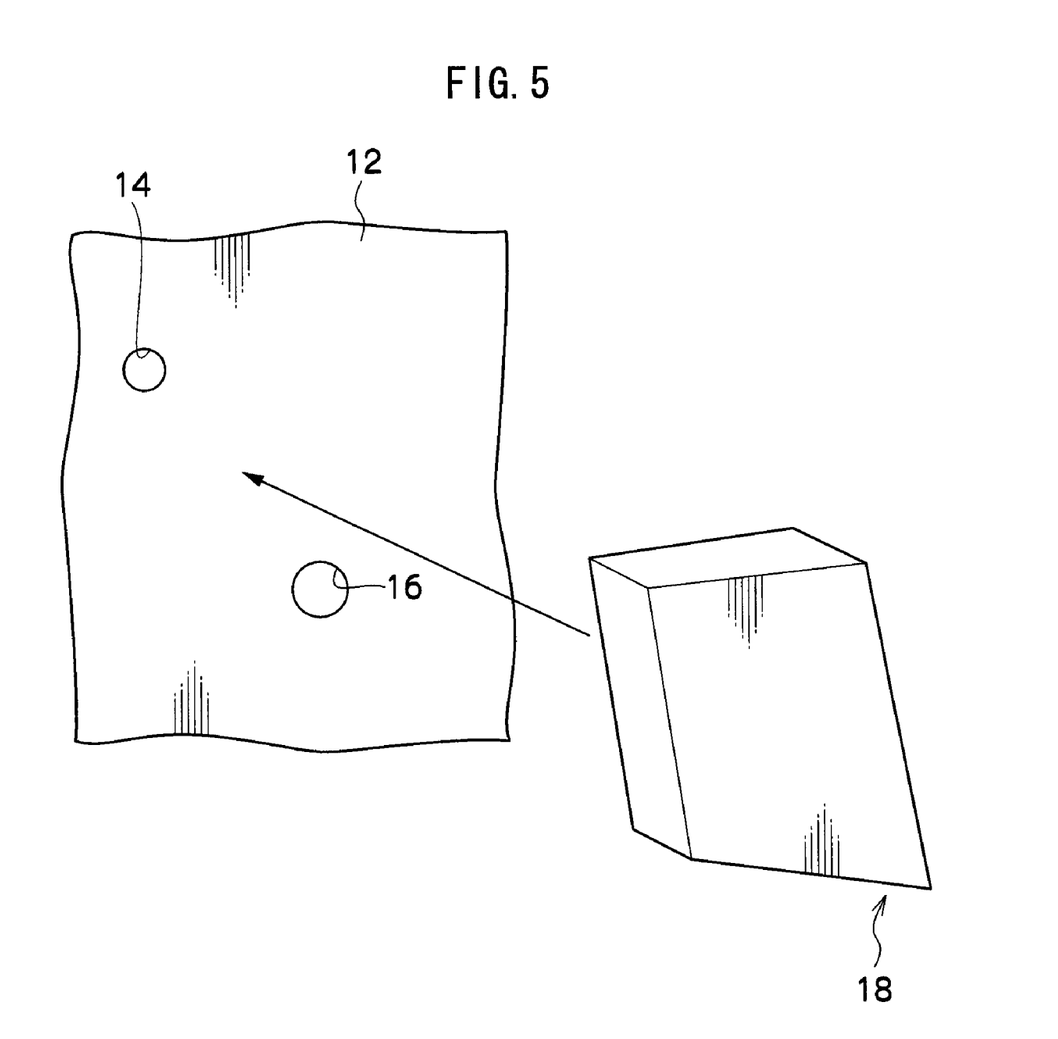
FIG. 5 is an explanatory view showing a panel of a vehicle body and a lamp unit, both of which are objects to be mounted by the mounting structure of the invention.
Figure 8A:
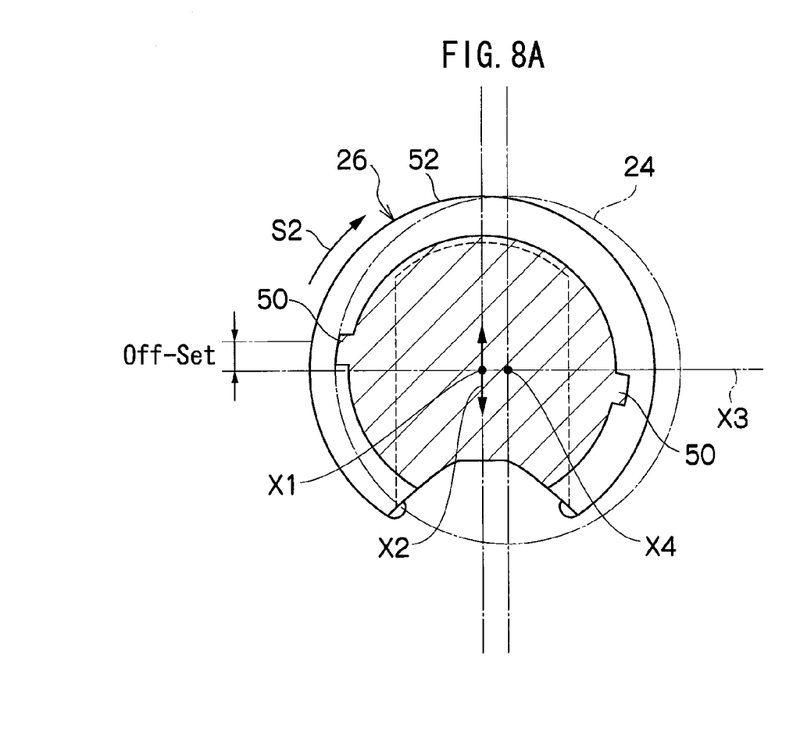
FIG. 8A is an explanatory view showing an operation, in a state before the cap pin is moved (rotated), in which the cap pin is fitted to the clip in the case where a direction of a deviation between the pin axis of the pin and the central axis of the clip is perpendicular to a sliding direction, and their central axes are positioned on a sliding orthogonal axis perpendicular to the sliding direction in the invention.
Figure 8B:
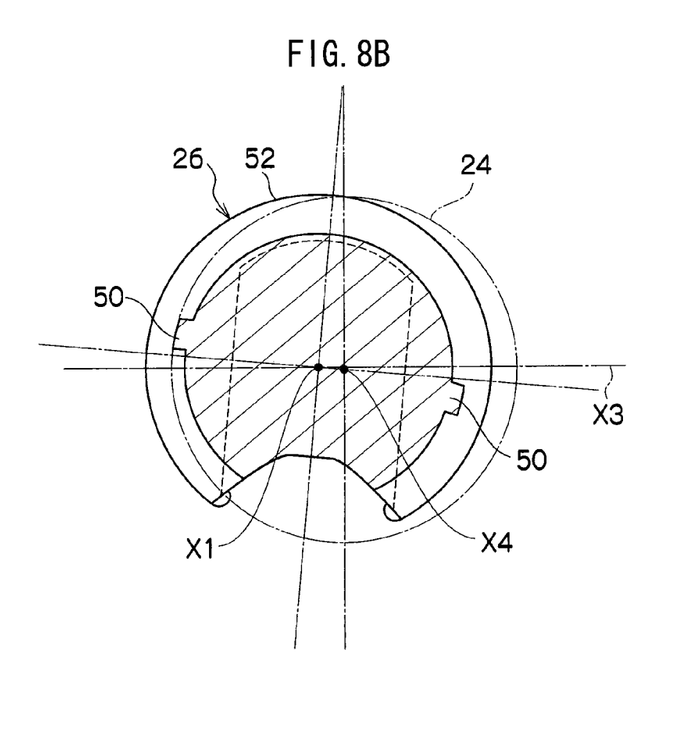
FIG. 8B is an explanatory view showing an operation, in a state after the cap pin is moved (rotated), in which the cap pin is fitted to the clip in the case where a direction of a deviation between the pin axis of the pin and the central axis of the clip is perpendicular to a sliding direction, and their central axes are positioned on a sliding orthogonal axis perpendicular to the sliding direction in the invention.

Also as shown in FIG. 4, a tip portion 52 of the cap pin 26 is formed in a tapered shape; and a pair of guide ribs 50 are formed on an outer circumference thereof. As shown in FIG. 8 in detail, the guide rib 50 is formed so as to partially protrude outward in a radial direction at a slightly circumferentially offset position from a sliding orthogonal axis X3 that is perpendicular to the sliding axis X2. By forming such guide ribs 50, as shown in FIG. 8A, the tip of the guide rib 50 comes into contact with an inner circumferential surface of the female side fitting portion 48 when the cap pin 26 is inserted to the female side fitting portion 48 of the clip 24 in an arrow S1 direction (see FIG. 2); and consequently, the cap pin 26 receives a circumferential direction (arrow S2 direction) force. Then, by this force, as shown in FIG. 8B, the cap pin 26 is relatively moved (or rotated) with respect to the clip 24.

Next, a method of mounting the lamp unit 18 to the panel 12 and an operation of the mounting structure 22 will be described by using the mounting structure 22 of the exemplary embodiment.

In order to mount the lamp unit 18 to the panel 12, the clip 24 is first fitted and fixed to the round hole 16.

In the cap pin 26, the pin 28 is inserted and fitted to the male side fitting portion 36 by pressing and enlarging the lateral insertion portion 38 from the lateral direction with respect to the pin axis X1. In the fitted state, the cap pin 26 is slidable in the sliding direction (arrow X2 direction) with respect to the pin 28, and is pivotable centered on the pin axis X1 of the pin 28. In addition, the frontage D1 of the lateral insertion portion 38 is smaller than the diameter D2; and therefore, the cap pin 26 does not come off without discretion in the sliding axis direction. Furthermore, since the narrow portion 32 of the pin 28 engages with the engaging portion 40 of the cap pin 26, the cap pin 26 does not also come off without discretion in the pin axis direction.

Figure 6A:
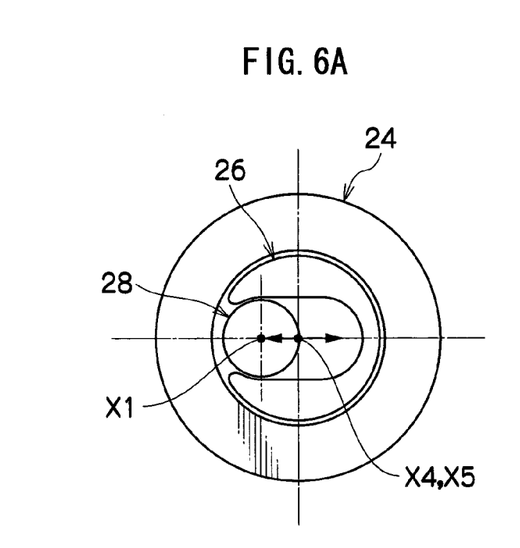
FIG. 6A is an explanatory view showing a state where the cap pin is fitted to the clip by absorbing a deviation occurred in the case where a pin axis of the pin is deviated from a central axis of the clip in the invention.
Figure 6B:
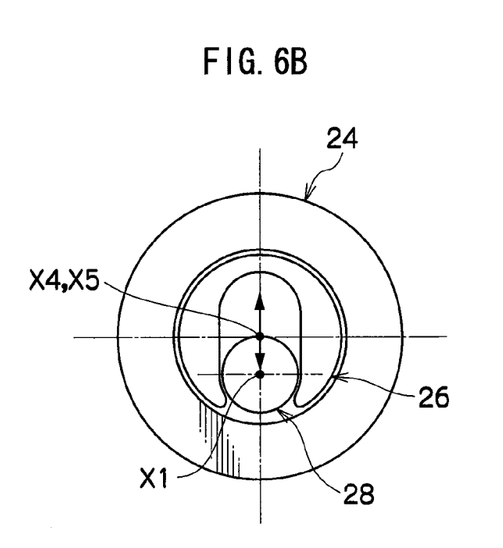
FIG. 6B is an explanatory view showing a state where the cap pin is fitted to the clip by absorbing a deviation occurred in the case where the pin axis of the pin is deviated from the central axis of the clip in the invention.
Figure 6C:
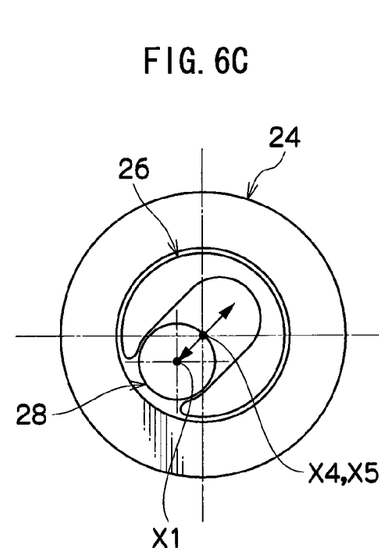
FIG. 6C is an explanatory view showing a state where the cap pin is fitted to the clip by absorbing a deviation occurred in the case where the pin axis of the pin is deviated from the central axis of the clip in the invention.

In this state, the bolt of the lamp unit 18 is inserted to the reference hole 14 and the pin 28 is inserted to the clip 24 at the same time, respectively; the pin 28 is fitted to the clip 24; and the lamp unit 18 is temporarily fixed to the panel 12. If required, bolts are further inserted to the sub-reference holes (not shown in the drawing). In addition, in the configuration in which the side surfaces of the lamp unit are used as the sub-reference, the side surfaces serving as the sub-reference are brought into contact with the sub-reference surfaces of the panel 12 side. In this case, for example, in a configuration in which the cap pin 26 is not rotatable and is not slidable with respect to the pin 28, when a slight deviation Z1 (see FIG. 2) is generated between the pin axis X1 of the pin 28 and the central axis X4 of the clip 24, the cap pin 26 may not be completely inserted to the female side fitting portion 48 of the clip 24. However, in the present exemplary embodiment, as shown in FIGS. 6A to 6C, in the case where a direction of the deviation between the central axes X1 and X4 conforms to the sliding direction of the cap pin 26, the centers are conformed by the sliding of the cap pin 26; and therefore, the cap pin 26 may be slidable to the clip 24.

Figure 7A:
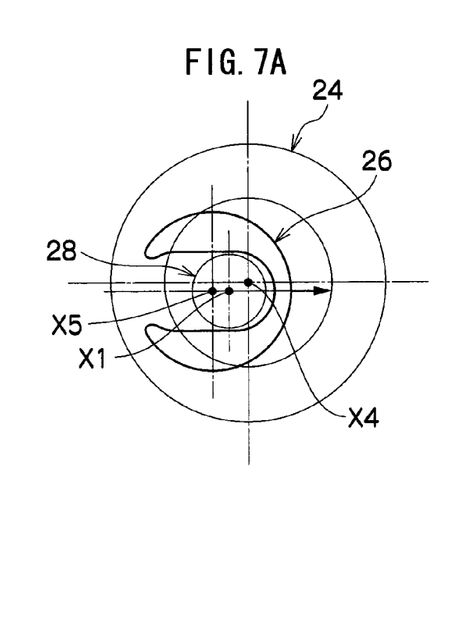
FIG. 7A is an explanatory view showing a first state of an operation in which the cap pin is fitted to the clip by absorbing a deviation occurred in the case where a direction of the deviation between the pin axis of the pin and the central axis of the clip does not conform to a sliding direction of the cap pin in the invention.
Figure 7B:
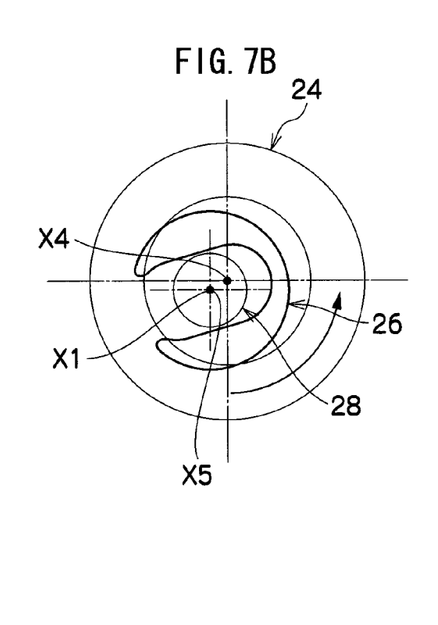
FIG. 7B is an explanatory view showing an operation, in a state after FIG. 7A, in which the cap pin is fitted to the clip by absorbing a deviation occurred in the case where a direction of the deviation between the pin axis of the pin and the central axis of the clip does not conform to a sliding direction of the cap pin in the invention.
Figure 7C:
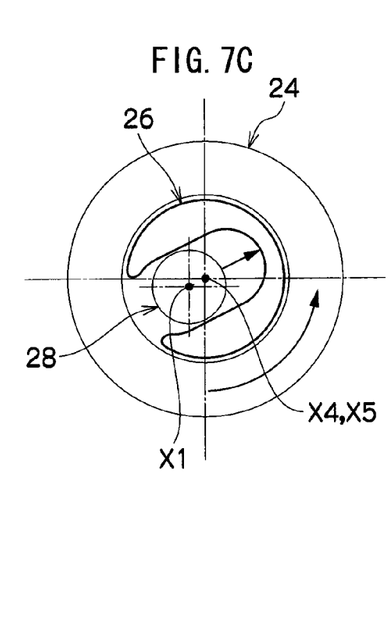
FIG. 7C is an explanatory view showing an operation, in a state after FIG. 7B, in which the cap pin is fitted to the clip by absorbing a deviation occurred in the case where a direction of the deviation between the pin axis of the pin and the central axis of the clip does not conform to a sliding direction of the cap pin in the invention.

Furthermore, even in the case where the direction of the deviation between the central axes X1 and X4 does not conform to the sliding direction of the cap pin 26, the tip portion 52 of the cap pin 26 comes into contact with the inner circumferential surface of the female side fitting portion 48 in a state where the cap pin 26 is on the way of being inserted into the clip 24, and the cap pin 26 is rotated and slid by its reaction force; accordingly, the central axis X5 of the cap pin 26 may be conformed to the central axis X4 of the clip 24; and therefore, the cap pin 26 may be inserted to the clip 24. That is, as shown in FIG. 7A, even in the case where a direction of a deviation between the central axis X1 of the pin 28 and the central axis X4 of the clip 24 does not conform, the cap pin 26 is rotated around the central axis X1 of the pin 28 and slid, as shown in FIG. 7B. Then, the central axis X5 of the cap pin 26 may be conformed to the central axis X4 of the clip 24, as shown in FIG. 7C.

In addition, as shown in FIG. 8A, in the case where the direction of the deviation between the central axes X1 and X4 is perpendicular to the sliding direction (arrow X2 direction) and their central axes X1 and X4 are positioned on the sliding orthogonal axis X3 perpendicular to the sliding direction, the above mentioned reaction force that is exerted when the cap pin 26 is inserted does not have a component which rotates the cap pin 26. However, in this case, the guide ribs 50 come into contact with the inner circumference of the female side fitting portion 48 of the clip 24, and the cap pin 26 is rotated in the arrow S2 direction, as shown in FIG. 8B. Since this enables the cap pin 26 to be rotatable and slidable; then, the central axis X5 of the cap pin 26 conforms to the central axis X4 of the clip 24 by the rotation and slide, and the cap pin 26 may be inserted and fitted to the female side fitting portion 48 of the clip 24. In doing so, the cap pin 26 is fitted and fixed to the clip 24, and the bolt inserted to the reference hole 14 is similarly screwed by the nut (not shown in the drawing), and the lamp unit 18 is mounted to the panel 12. As described above, a part of the structure which is for mounting and fixing the lamp unit 18 to the panel 12 is formed in a structure in which the cap pin 26 is merely inserted to the clip 24; and accordingly, mounting work may be easily performed even in the case where a work space is narrow.

Figure 9:
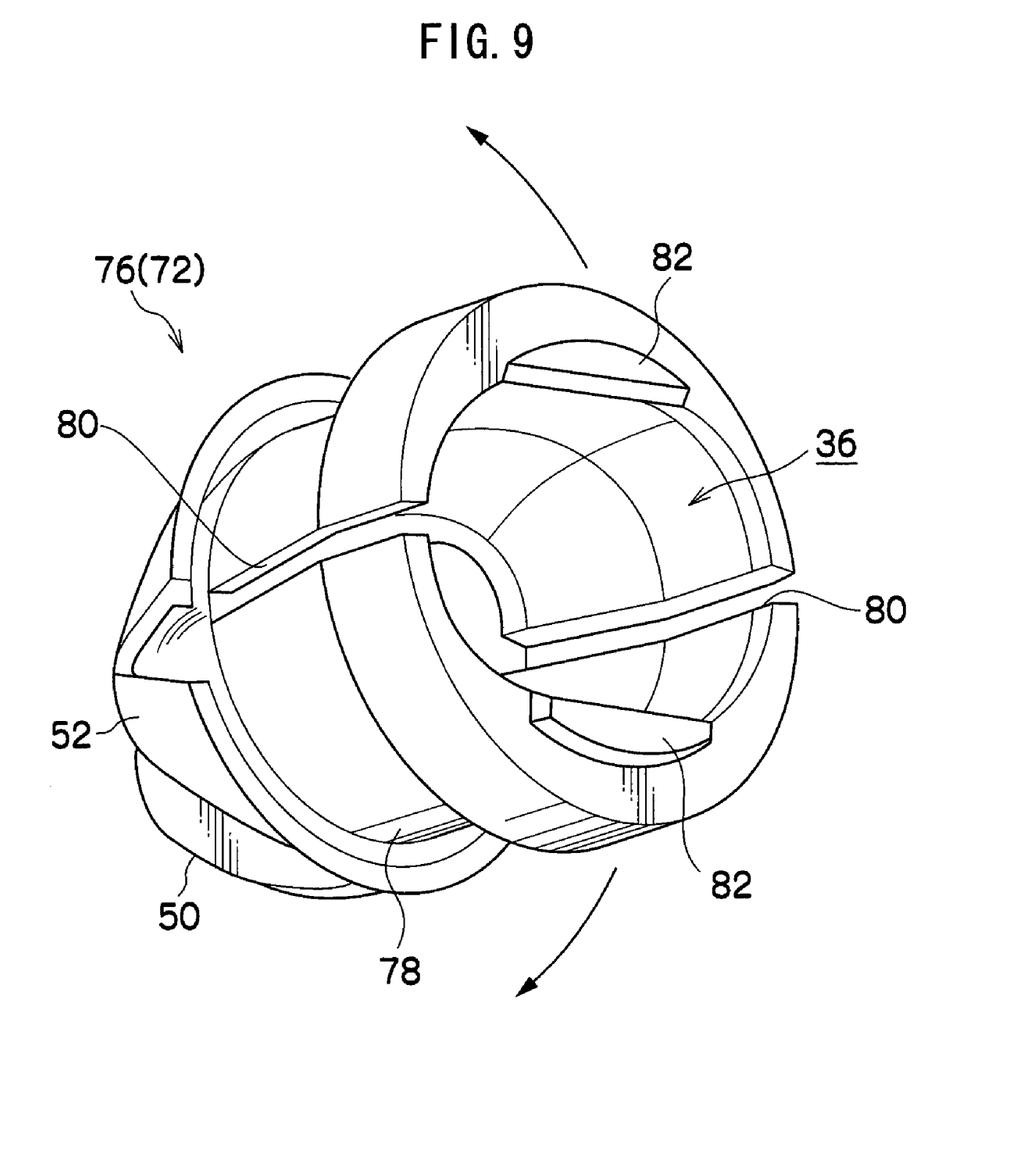
FIG. 9 is a perspective view showing a cap pin constituting a mounting structure of a second exemplary embodiment of the invention.

FIG. 9 shows a cap pin 76 of a second exemplary embodiment of the invention. In a mounting structure 72 of the second exemplary embodiment, only the cap pin 76 is different from the first exemplary embodiment; however, except the cap pin 76, the mounting structure 72 has the same configuration. Therefore, in the following, only different points will be described; the same reference numerals are given to those identical to constitutional elements and members in the first exemplary embodiment; and their detail description will be arbitrarily omitted.

Figure 10:
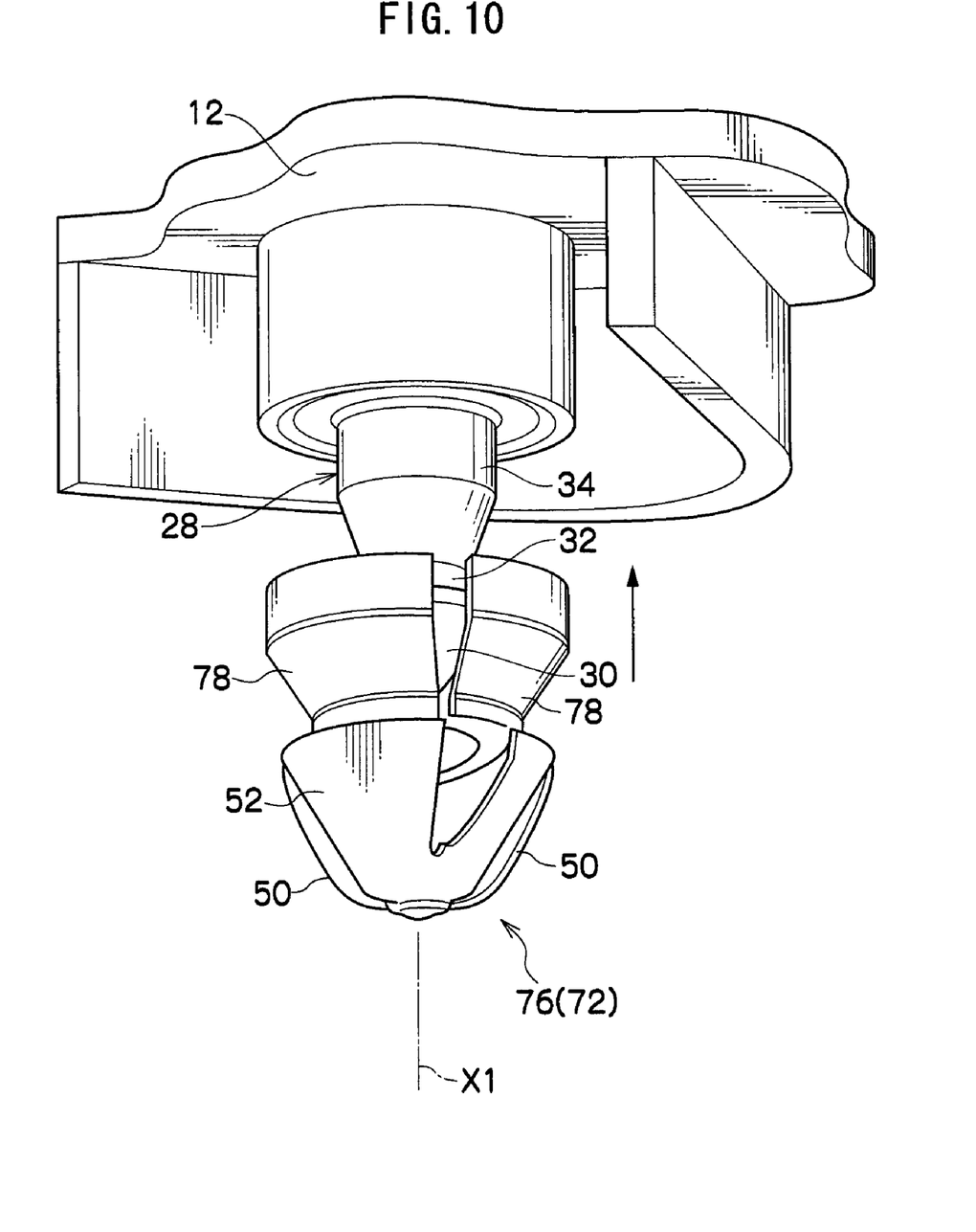
FIG. 10 is a perspective view showing a state where a pin is on the way of being inserted into the cap pin according to the second exemplary embodiment of the invention.
Figure 11:
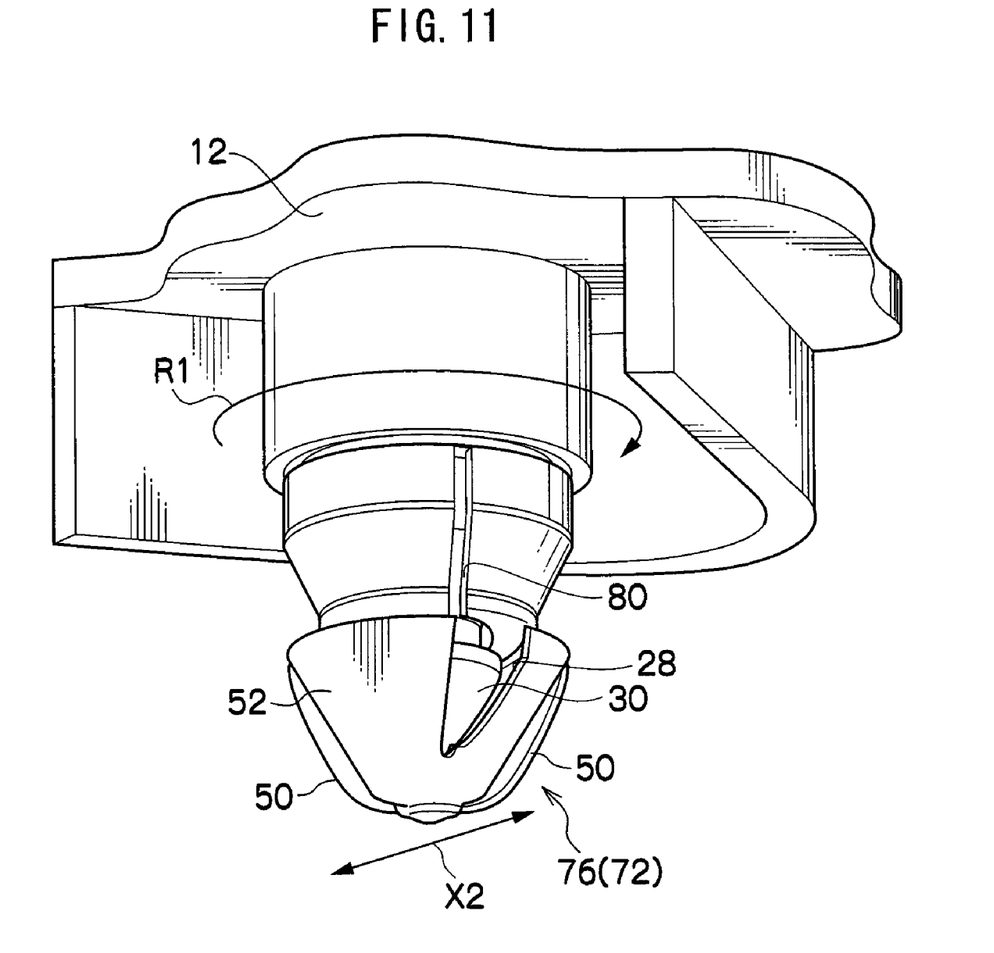
FIG. 11 is a perspective view showing a state where the pin is inserted to the cap pin according to the second exemplary embodiment of the invention.

The lateral insertion portion 38 (see FIG. 1) is not formed in the cap pin 76 of the second exemplary embodiment, the pin 28 is inserted and fitted in the pin axis X1 direction. One or a plurality (two at positions at a central angle of 180° in the present exemplary embodiment) of slits 80 are formed in a sidewall 78 of the cap pin 76. As shown in FIG. 10, when the pin 28 is inserted to the cap pin 76, the sidewall 78 is pressed and enlarged by the tip portion 30 of the pin 28; and accordingly, the sidewall 78 is elastically deflected in a mutually separating direction. Then, after the pin 28 is fitted to the cap pin 76, as shown in FIG. 11, the sidewall 78 is elastically restored in shape; and accordingly, the engaging portion 40 is engaged with the narrow portion 32 so as not to come off without discretion.

Furthermore, a pair of guide walls 82 facing toward the inner side are formed on the rear end of the cap pin 76. The tips of these guide walls 82 are formed in parallel; and the pin 28 is guided by the guide walls 82 and may be slidable in the direction of the sliding axis X2.

As described above, even the cap pin 76 having a structure in which the pin 28 is inserted and fitted in the pin axis direction, the cap pin 76 is rotatable and slidable with respect to the pin 28 as in the first exemplary embodiment; and therefore, a deviation between the central axis X1 of the pin 28 and the central axis X4 of the clip 24 may be absorbed by the cap pin 76 and their axes may be conformed.

In this manner, the direction in which the pin 28 is inserted and fitted to the cap pin is not particularly limited. In an actual production line, there is also a case where a work space between the panel 12 and the lamp unit 18 is limited; and therefore, in view of this, the cap pin configuration of the first exemplary embodiment or the second exemplary embodiment may be applied from the view point of enhancing workability.

Furthermore, in the above mention, there is shown the example in which the clip 24 is fixed to the panel 12 of the vehicle body and the pin 28 is protruded from the lamp unit 18; however, even if such a relation is reversed, the invention may be applied.

Further, in the above mention, as the example of the object to be mounted of the invention, there is shown the example of the panel 12 of the vehicle body and the lamp unit 18 to be mounted to the panel 12; however, the object to be mounted is not also limited to this, but in the case where any two or more members are mounted, the invention may be applied.

Description of Reference Numerals
- 12 Panel (object to be mounted)
- 14 Reference hole
- 16 Round hole
- 16S Sandwiching surface
- 18 Lamp unit (object to be mounted)
- 22 Mounting structure
- 24 Clip (female mounting member)
- 26 Cap pin (male mounting member)
- 28 Pin
- 30 Tip portion
- 32 Narrow portion
- 34 Base portion
- 36 Male side fitting portion
- 38 Lateral insertion portion
- 40 Engaging portion
- 42 Tip portion
- 44 Flange portion
- 46 Intermediate portion
- 48 Female side fitting portion
- 50 Guide rib
- 52 Tip portion
- 72 Mounting structure
- 76 Cap pin
- 78 Sidewall
- 80 Slit (enlargable portion)
- 82 Guide wall
- D1 Frontage
- D2 Diameter
- D3 Hole width
- X1 Pin axis (central axis of pin)
- X2 Sliding axis
- X3 Sliding orthogonal axis
- X4 Central axis of clip
- X5 Central axis of cap pin

The invention claimed is:

1. A mounting structure comprising:
a female mounting member to be mounted on one of objects to be mounted, wherein the female mounting member has a substantially tubular shape;
a female side fitting portion provided on the female mounting member;
a male mounting member to be rotatably fitted to the female side fitting portion;
a pin that is formed on another of the objects to be mounted; and
a male side fitting portion, the male side fitting portion being configured such that the pin is fitted therein, and such that when the pin is fitted in the male side fitting portion, the male mounting member is rotatable around the pin and slidable with respect to a direction perpendicular to a longitudinal pin axis direction of the pin,
wherein the male mounting member is provided with a lateral insertion portion which enables the pin to be inserted to the male side fitting portion from the direction perpendicular to the pin axis direction, and wherein the lateral insertion portion has a frontage which is formed smaller than a portion corresponding to the frontage of the pin when the pin is inserted to the lateral insertion portion.

2. The mounting structure of claim 1,
wherein the male mounting member is provided with a guide rib which comes into contact with an inner surface of the female side fitting portion when the male mounting member is fitted to the female side fitting portion, and rotates the male mounting member in the direction perpendicular to the pin axis direction by a reaction force acting at the contact.

3. The mounting structure of claim 1,
wherein the male mounting member is formed with an engaging portion which locks the pin by engaging with a narrow portion of the fitted pin.

4. The mounting structure of claim 1,
wherein the male mounting member has a tip portion which is tapered off.

5. The mounting structure according to claim 1, wherein:
the pin includes a tip portion and a narrow portion, the tip portion gradually decreasing in diameter toward a tip of the pin and the narrow portion having a diameter smaller than a diameter of part of the tip portion.

6. The mounting structure of claim 1, wherein when the pin is fitted in the male side fitting portion, there is a gap between the pin and the male side fitting portion, wherein the gap extends in the direction perpendicular to the longitudinal pin axis direction of the pin.

* * * * *